UNITED STATES PATENT OFFICE.

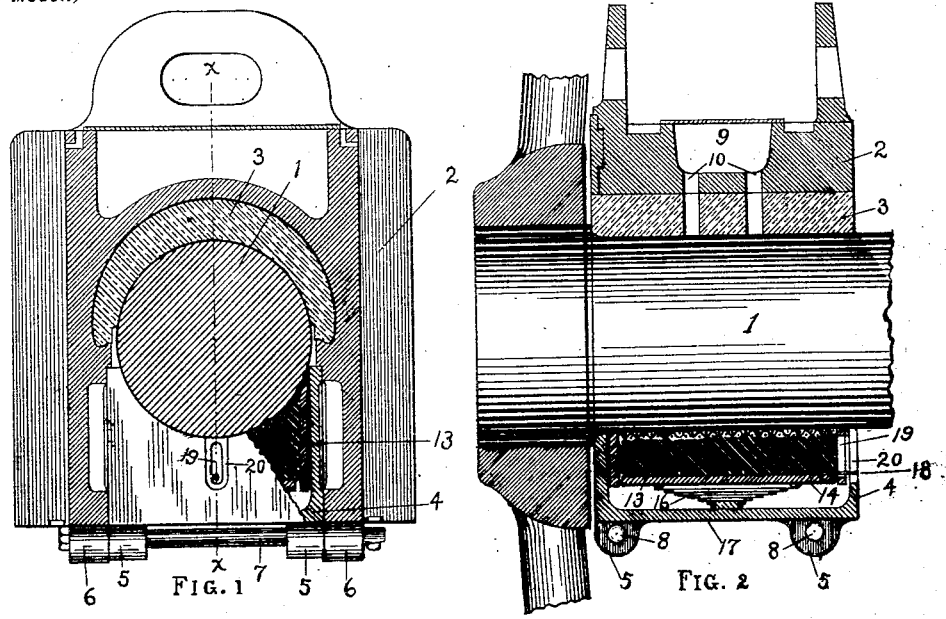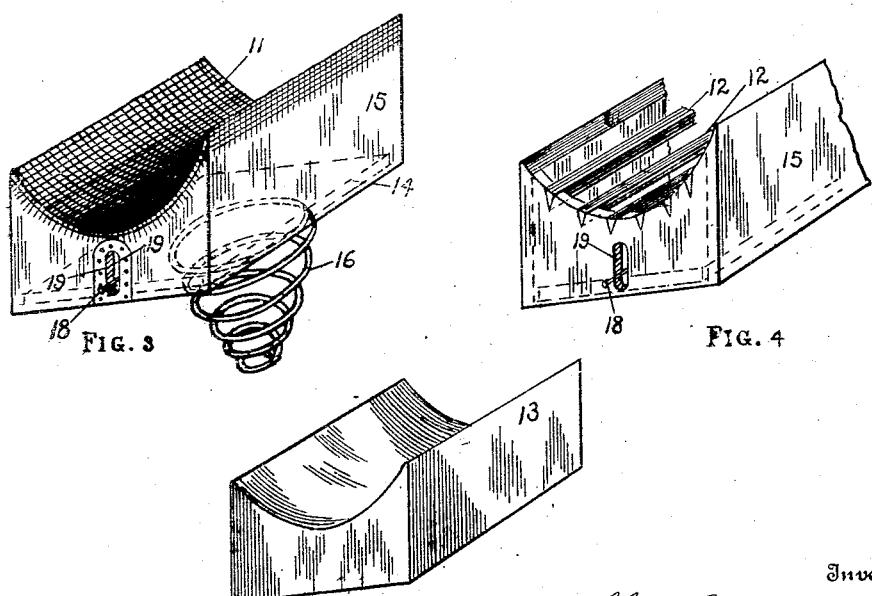

ALBERT G. ELVIN, OF SCRANTON, PENNSYLVANIA.

LUBRICATING DEVICE.

SPECIFICATION forming part of Letters Patent No. 713,410, dated November 11, 1902.

Application filed May 15, 1902. Serial No. 107,536. (No model.)

*To all whom it may concern:*

Be it known that I, ALBERT G. ELVIN, a citizen of the United States, residing at Scranton, in the county of Lackawanna and State of Pennsylvania, have invented certain new and useful Improvements in Lubricating Devices, of which the following is a specification.

This invention relates to lubricators for journals or other bearings; and the objects of the invention are to provide a continuous lubrication for an extended period of time, to facilitate the application of solid grease to journals and other bearings, to provide a lubricator that increases the supply of lubricant with the heating of the journal, and to regulate the application of the pressure of the lubricant feed, and other objects, as are herein specified, and more particularly pointed out in the claims.

To these ends my invention consists of the construction, arrangement, and combination of parts as exemplified in the drawings accompanying, in which—

Figure 1 is a partial transverse cross-section of a locomotive-axle box, showing the application of my invention to the journal of a locomotive-axle. Fig. 2 is a cross-section of all the parts, except the axle, taken on the line x x of Fig. 1. Fig. 3 is a view of the lubricant-case and its attachments, constituting the principal features of my invention. Fig. 4 illustrates a substitute method of constructing the concave upper side of the case. Fig. 5 illustrates the form or configuration of a piece of solid lubricating material adapted to be used in connection with my device.

In the illustrations the form of my device is such as is suitable to locomotive axles or shafts; but it is evident that the top may be plain or convexed or any other suitable form for surfaces different from that of journals or axles.

Similar characters of reference denote like and corresponding parts throughout the views.

In the drawings, 1 denotes the journal of a locomotive-axle, fitted into a box 2, having the usual brass bearings 3 and lubricant-cellar 4, the lubricant-cellar being held in place by means of lugs 5 on the cellar 4 coinciding with lugs 6 on the journal-box 2 and a suitable rod 7 passing through eyes 8 of the said lugs. It will be understood that the cellar 4 is an element in the journal-boxes now in use, in which cotton-waste soaked with lubricating-oil is usually placed for the purpose of lubrication of the axle. The journal-box 2 shown also provides means for additional lubrication from the well 9, which has passage-ways 10 leading through the brass bearing 3.

In my device I substitute for the usual cotton-waste placed in the cellar 4 a lubricant-case, as shown in Fig. 3, with a solid block of lubricant fitted therein of the form shown in Fig. 5. The upper concave covering of the case is preferably constructed from wire-cloth 11, for the wire-cloth may be substituted, perforated, or foraminated material of various kinds, or the same may be dispensed with altogether and the top constructed with wooden strips 12 12, wedge-shaped in cross-section and set with their edges downward, the object of the strips being to hold the lubricant mass 13 in integral form until it is used up. The lubricant 13 is pressed against the screen 11 by means of a sliding bottom 14, which exactly fits into the box or case 15 and is constrained upward by means of a conical spiral spring 16, having its apex resting on the bottom 17 of the cellar and its upper coils impinging on the sliding bottom 14 of the case 15 aforesaid. A peg 18 is secured to one end of the sliding bottom 14 and extends through a slot 19 in one end thereof. When the case is placed within the cellar, the said slot 19 registers or coincides with a similar cut-away portion 20 in the corresponding wall of the cellar 4, thus furnishing an indicator for the attendant to see how far the lubricant has worn away without opening the box.

In using the device the case 15 is placed against the journal to be lubricated, with the screen 11 in contact with the moving surface. The solid lubricant being placed within the case is compressed against the opposite side of the screen 11 by means of the spring 16 being constrained against the movable bottom 14 of the case. By placing the lubricant-case on the under side of the axle the lubricant is supported and pressed into engagement with the axle by the coiled spring, and as it wears away and gradually becomes lighter the coiled spring becomes elongated, and being under less strain is of course weaker, and in this way the lubricant is compressed equally hard against the axle whether the case be full or partially empty, the tension of the spring increasing or decreasing in direct proportion with the weight of the mass supported. Where the strips 12 are substituted for the wire-cloth, the pressure of the spring underneath forces the lubricant between the strips, and they serve to hold it from breaking or rolling up into separate masses, or, in other words, preserve the integrity of the whole. By constructing the strips wedge-shaped, as shown, I find that no difficulty is experienced in having the solid lubricant pressed up between them in engagement with the axle by the spring and slidable bottom above described.

Having thus described my invention, what I claim, and desire to secure by Letters Patent, is—

1. The herein-described lubricating device comprised in a lubricant-case arranged to be fitted in the cellar of an axle-box, a movable bottom in said lubricant-case, a screen covering the area thereof opposite said bottom, springs arranged to constrain said bottom in the direction of said screen, said case being adapted to contain a mass of solid lubricant between said screen and movable bottom, substantially as and for the purpose specified.

2. A lubricating device of the kind described comprised in a lubricant-case arranged to be fitted in the cellar of an axle-box, one side of said case being concave to conform to the cylindrical surface of a journal, a wire screen lining said concave side, a movable part substantially equal in area to the whole interior of the case and slidable therein, fitted within said case opposite said concave side, and said case having a space for lubricant arranged between the screen aforesaid and said movable part, together with springs arranged to constrain said movable part against the mass of lubricant for the purpose of forcing the same through the screen aforesaid, substantially as and for the purpose specified.

3. In an axle-lubricator of the kind described, in combination with the lubricant-cellar, a lubricant-containing case of an approximately corresponding area inserted therein, a screen-covering closing the top of said case and arranged to lie in contact with the axle to be lubricated, a sliding bottom within said case, springs impinging thereon and arranged to constrain it in the direction of the screen aforesaid, the said case being adapted to contain a mass of solid lubricant between said screen and movable bottom, substantially as and for the purpose specified.

4. In combination with the lubricant-cellar of an axle-box a lubricant-case adapted to hold a mass of solid lubricant, a movable bottom in said case, springs arranged to constrain said bottom against a mass of lubricant within the case, a pin or projecting part on said movable bottom extending out through slots in the side of the case and a wall of the cellar aforesaid whereby the position of the said movable bottom is indicated, substantially as and for the purpose specified.

5. In combination, the lubricant-cellar of an axle-box, a lubricant-case having a concave side disposed toward the axle to be lubricated, a screen or perforated cover closing the said concave side, a sliding bottom closing the opposite side of said case, and the interior of said case adapted to contain a mass of solid lubricant, springs arranged between the slidable bottom aforesaid and the bottom of the cellar and adapted to constrain the contents of the case against the screen aforesaid, a pin or projection on said slidable bottom extending through slots in the side of the case and a wall of the cellar aforesaid for the purpose of indicating the position of said slidable bottom, all arranged to the joint operation substantially as specified.

In testimony whereof I affix my signature in presence of two witnesses.

ALBERT G. ELVIN.

Witnesses:
  F. J. DE LACEY,
  D. G. MORAN.